(12) United States Patent  
Miyake (10) Patent No.: US 7,730,354 B2  
(45) Date of Patent: Jun. 1, 2010

(54) CONTROL MICROCOMPUTER VERIFICATION DEVICE AND VEHICLE-MOUNTED CONTROL DEVICE

(75) Inventor: Junji Miyake, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 399 days.

(21) Appl. No.: 11/950,125

(22) Filed: Dec. 4, 2007

(65) Prior Publication Data

US 2008/0147949 A1 Jun. 19, 2008

(30) Foreign Application Priority Data

Dec. 18, 2006 (JP) ............................. 2006-340039

(51) Int. Cl.
*G06F 11/00* (2006.01)
(52) U.S. Cl. .......................... 714/31; 714/55
(58) Field of Classification Search ................... 714/31, 714/55
See application file for complete search history.

(56) References Cited

U.S. PATENT DOCUMENTS

| 5,163,016 A * | 11/1992 | Har'El et al. ................... 716/5 |
| 7,496,788 B1 * | 2/2009 | Alfieri et al. .................... 714/21 |
| 2003/0135842 A1 * | 7/2003 | Frey et al. ..................... 717/121 |
| 2003/0226124 A1 * | 12/2003 | Marschner et al. .............. 716/4 |
| 2005/0204345 A1 * | 9/2005 | Rivera et al. ................. 717/127 |
| 2005/0278576 A1 * | 12/2005 | Hekmatpour ................. 714/37 |
| 2006/0020949 A1 | 1/2006 | Hoshino et al. |
| 2006/0036914 A1 * | 2/2006 | Neumiller et al. ............. 714/55 |
| 2006/0085774 A1 | 4/2006 | Moorby |
| 2006/0190239 A1 * | 8/2006 | Piper et al. ..................... 703/26 |
| 2007/0132477 A1 * | 6/2007 | Balog et al. .................. 324/765 |
| 2007/0230645 A1 * | 10/2007 | Ly et al. ...................... 375/354 |
| 2008/0066030 A1 * | 3/2008 | Hekmatpour et al. .......... 716/5 |
| 2008/0082946 A1 * | 4/2008 | Zilic et al. ...................... 716/5 |
| 2009/0144010 A1 * | 6/2009 | Witter et al. ................. 702/115 |

(Continued)

FOREIGN PATENT DOCUMENTS

EP          1 628 222 A2     2/2006

(Continued)

OTHER PUBLICATIONS

Japanese Office Action with English translation (Four (4) pages) dated Mar. 3, 2009.
Search Report/Office Action dated Aug. 4, 2008 (eight (8) pages).
Lemire, JF. et al., "Implementing e Assertion Checkers From an SDL Executable Specification", [Online] 2003, pp. 1-8, Proc. Of Design and Verification Conference, San Jose, USA, XP00248148.

(Continued)

*Primary Examiner*—Bryce P Bonzo
(74) *Attorney, Agent, or Firm*—Crowell & Moring LLP (57) ABSTRACT

The present invention offers an advanced control software verification technology, particularly, an assertion-based verification technology, by providing a control microcomputer verification device and vehicle-mounted control device that exhibit improved verification efficiency. Assertion-based verification is performed with a verification device that has a hardware configuration in which the verification device is independent of a CPU core of a microcomputer but operates in parallel with the CPU core of the microcomputer, which sequentially executes control software. The hardware to be employed to achieve the above purpose is a finite state machine based on microprogrammed control. An interrupt factor is branched immediately before an interrupt controller for the microcomputer and used as a transition input. When an abnormal transition is detected, a warning is output to the microcomputer as an interrupt or output to the outside in the form of a signal.

8 Claims, 9 Drawing Sheets

U.S. PATENT DOCUMENTS

2009/0192754 A1* 7/2009 Balog et al. .................. 702/117
2009/0193294 A1* 7/2009 Nakamura et al. ............ 714/26

FOREIGN PATENT DOCUMENTS

JP        2-92535 U     7/1990
JP        2006-12017 A  1/2006

OTHER PUBLICATIONS

Bornione, D. et al., "On-Line Assertion-Based Verification with Proven Correct Monitors", Information and Communications Technology, 2005. Enabling Technologies For The New Knowledge Society ITI 3$^{RD}$ International Conference On Cairo, Egypt 05-05- Dec. 2005, Piscataway, NJ, USA, IEEE Dec. 5, 2005 pp. 123-143, XP010911059.

Peterson, K. et al., "Assertion-Based On-Line Verification and Debug Environment for Complex Hardware Systems" Circuits and Systems, 2004. ISCAS '04 Proceedings Of The 2004 International Symposium On Vancouver, BC, Canada May 23-26, 2004, Piscataway, NJ, USA, IEEE, US, vol. 2, May 23, 2004 pp. 685-688, XP010720429.

* cited by examiner

```
struct functbl
    mode_type    status;        /* STATE TO SWITCH TO */
    void         (*fp)(void);   /* ADDRESS OF PROCESS FUNCTION TO BE RECALLED */
};
#difine  MAXEVENT 3
define  MAXSTATUS 5 struct functbl StateTransTbl[MAXEVENT][MAXSTATUS]={
          /*S0       S1        S2        S3        S4*/
/*IC*/    {0,nop},  {2,nop},  {0,err},  {0,err},  {3,nop},
/*OC*/    {0,nop},  {4,nop},  {3,nop},  {1,nop},  {0,err},
/*TR*/    {1,nop},  {1,nop},  {2,nop},  {3,nop},  {4,nop},
};
```
— 801

```
void state_control_loop(void)
{
    mode_type    status=0;
    mode_type    nextstatus;
    event_type   event;
    void         (*callp)();

for(;;){     /* INFINITE LOOP */
        event=Wait Event();                              /* EVENT WAIT PROCESS */ nextstatus=StateTransTbl[event][status].status;  /* SETUP OF NEXT STATUS */
        callp=StateTransTbl[event][status].fp;           /* SETUP OF FUNCTION TO BE RECALLED */
        (*callp)();                                      /* RECALL OF FUNCTION RELATED TO STATE AND EVENT */
        status=nextstatus;                               /* STATUS CHANGE */
    }
}
```
— 802

```
void nop(void){
    /* DO_NOTHING FUNCTION */
}
```
— 803

```
void err(void){
    /* ABNORMALITY WARNING PROCESS */
}
```
— 804

CONTROL MICROCOMPUTER VERIFICATION DEVICE AND VEHICLE-MOUNTED CONTROL DEVICE

BACKGROUND OF THE INVENTION

1. Field of the Invention

The present invention relates to a control microcomputer verification device and vehicle-mounted control device, and more particularly to a verification device and vehicle-mounted control device that are used to perform assertion-based verification (ABV) of state transition caused by control software, which is sequentially executed by a microcomputer.

2. Description of the Related Art

In recent years, it is demanded that in-vehicle control software exhibit enhanced operation reliability due to an increased use of electronic machine parts. It goes without saying that the required level for software functional accuracy and the design level for design system strictness are raised in accordance with the above demand.

In particular, the design of state transition within a control algorithm is a problem. A state transition design must be made so that an external phenomenon is flexibly coped with in relation to an event generated by a system. This is a great advantage provided when electronic parts are used for the control of vehicle-mounted functional members, and serves as a key factor for meeting the requirements for control enhancement and refinement. Further, considerable attention is paid to control algorithm reliability from a viewpoint of safety. Electronic hardware and control software can be effectively used to make a valuable contribution to the field of functional safety.

As the number of vehicle-mounted electronic parts increases, it would be increasingly important that proper implementation of the required level and design level be verified.

A design phase for vehicle-mounted electronic parts, particularly, an activity for creating control software for operating an embedded microcomputer, is characterized by the fact that a so-called state machine is designed with attention paid to an internal state definition related to system behavior, a state transition condition (event), and an action taken upon state transition.

A currently employed common method for enhancing the quality and reliability of the control software is to create the software by considering all possible internal state definitions and transition conditions. If the encountered combination of an internal state and a transition condition is undefined or unexpected, a software automatic generation technology that is based on a state transition table and disclosed, for instance, by JP-A-2006-12017 automatically inserts an exception process or the like to enhance the stability of the control software.

The software automatic generation technology mentioned above is counted as an advance design technology that clarifies all possible conditions prior to the software design, takes all the clarified conditions into consideration, and improves the robustness of software.

SUMMARY OF THE INVENTION

As described above, there is a pressing need for exploring a method of improving the quality and reliability of vehicle-mounted control software, which operates a microcomputer, and a method of verifying that a predefined level is attained by the improved quality and reliability.

The known technology disclosed by JP-A-2006-12017 clarifies all possible state transition definitions in advance to improve the quality and reliability of control software. However, since it is an advance design technology, it does not assume the verification in the actual operational settings. Further, no matter how an advance design is made strictly, overall quality and reliability cannot be fully assured unless verification is performed through actual operations, which is governed by the god of physics.

If, for instance, there is an error in a transition condition (event) for shifting from a particular internal state to another, no problem occurs at a design stage; however, the created control software behaves in an unexpected manner during an actual operation. Further, if a wrong internal state is designated as a transition destination, the control software also behaves in an unexpected manner during an actual operation.

It is common knowledge that even if internal state definitions, state transition conditions (events), and actions to be taken during the transition are elaborately designed in advance, the quality and reliability of control software cannot be determined in reality unless the behavior of the control software is monitored and verified during an actual operation.

Further, a failure related to a control software transition condition (event) or an erroneous transition between internal states incurs a rare failure concerning overall system timing. Such a rare failure is likely to occur once each hour or once each day in the actual vehicle operational settings.

In general, the above-mentioned timing-related failures cannot be readily captured and subjected to phenomenon analysis. A conventionally used verification method was to connect a logic analyzer to a microcomputer, elaborately devise a logic analyzer trigger condition, and make a phenomenon analysis (analyze an internal factor of software failure).

In recent years, however, the use of a vehicle-mounted microcomputer in which a bus connectable to a logic analyzer is open has decreased due, for instance, to microcomputer chip miniaturization and operating frequency increase.

Meanwhile, there are evaluation chips that substitute to exercise the functions of a vehicle-mounted microcomputer and are connectable to a logic analyzer or other debugging tool via a bus. In most cases, however, the electrical functions of the evaluation chips are not sufficiently equivalent to those of marketed microcomputers. Further, most of the evaluation chips have low noise immunity. Therefore, the evaluation chips cannot be subjected to real machine verification.

In addition, currently available microcomputers are not suitable for assertion-based verification of control software.

Assertion-based verification is a method of running a check on the assumption that a certain design property is established. When a contrary condition, that is, a condition contrary to the assumed property, is detected, this verification method concludes that the contrary condition stems from the software specification or logical flaws.

The scale of control software is increasing year after year, thereby increasing the number of items to be verified. Assertion-based verification is at an advantage in that it offers a practical, reasonable verification tool for use in the situation where the number of test items is explosively increased.

When assertion-based verification is to be performed by using a present-day microcomputer configuration, an assertion-based verification function is incorporated into ordinary control software to check for the deviation from assertions (assertion errors).

In other words, operation monitoring software for assertion-based verification needs to be added to ordinary control software. It means that the CPU processing time required for other than a control algorithm is considerably increased. The operation monitoring software, which checks for the deviation from assertions (assertion errors), is used only for software verification. Therefore, the associated resource consumption is too much to provide advantages when the overall system is considered.

Further, even when the operation monitoring software is incorporated into the control software, fault detection cannot properly be achieved if, for instance, a portion of other than the operation monitoring enters an infinite loop upon breakdown of the stop function of the software.

The present invention has been made to solve the above problems. An object of the present invention is to offer an advanced control software verification technology, particularly, an assertion-based verification technology, by providing a control microcomputer verification device and vehicle-mounted control device that exhibit improved verification efficiency.

In accomplishing the above object, according to one aspect of the present invention, there is provided a control microcomputer verification device that is installed separately from a microcomputer that sequentially executes control software, is allowed to operate in parallel with the microcomputer, and verifies a function that is to be implemented by the microcomputer when the control software is sequentially executed, the control microcomputer verification device including timing-sequence assertion means for storing an internal state that is predefined in accordance with the function to be implemented by the microcomputer and input information indicating a condition for transition from one internal state of the microcomputer to another. The timing-sequence assertion means operates in parallel in real time according to an operation of the microcomputer, estimates the internal state of the microcomputer, and detects whether the internal state has deviated from the transition condition.

When a deviation from the transition condition is detected, the control microcomputer verification device according to the present invention performs an output process to issue a warning. The output process for the warning issuance is performed to output a warning signal to the outside by using a hardware output of the timing-sequence assertion means or output an interrupt signal to the microcomputer to have the microcomputer recognize the abnormality detection.

According to another aspect of the present invention, there is provided the control microcomputer verification device, wherein the timing-sequence assertion means is provided separately from the microcomputer as hardware formed by a finite state machine based on microprogrammed control.

According to another aspect of the present invention, there is provided the control microcomputer verification device, wherein the timing-sequence assertion means includes a control storage based on microprogrammed control, derives the internal state and the transition condition from a state transition table describing the operating state transition of the control software, and performs assertion verification of state transition.

According to another aspect of the present invention, there is provided the control microcomputer verification device, wherein the timing-sequence assertion means in parallel inputs an interrupt event signal, which is input to an interrupt controller from the outside of the microcomputer or from a peripheral device as an input of hardware formed by a finite state machine, and performs assertion verification of state transition.

According to another aspect of the present invention, there is provided the control microcomputer verification device, wherein the timing-sequence assertion means inputs an interrupt signal based on a software trap instruction, which is fed back from the microcomputer to an interrupt controller, as an input of hardware formed by a finite state machine, and performs a process for synchronizing with software sequentially executed by the microcomputer.

According to still another aspect of the present invention, there is provided a vehicle-mounted control device that includes the control microcomputer verification device according to the present invention.

The control microcomputer verification device according to the present invention makes it possible to add an assertion-based verification function concerning control software or the entire system and perform verification with high verification efficiency without imposing an increased load on the microcomputer to be verified or on the control software.

DETAILED DESCRIPTION OF THE PREFERRED EMBODIMENTS

Figure 1:
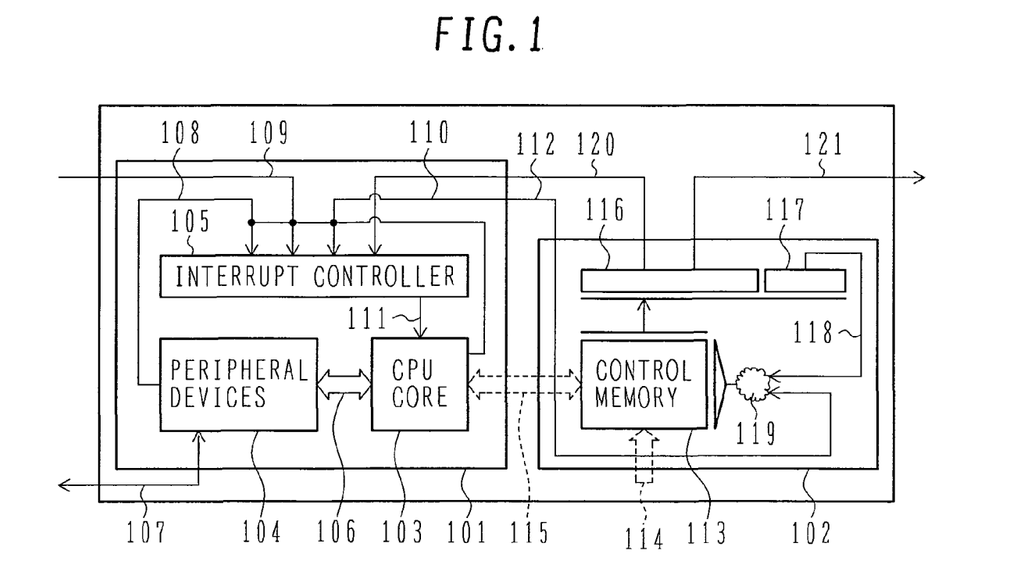
FIG. 1 is a functional block diagram illustrating a control microcomputer verification device and microcomputer according to an embodiment of the present invention.

FIG. 1 shows an embodiment of a control microcomputer verification device according to the present invention and a microcomputer for sequentially executing the control software to be verified.

The microcomputer 101 is a control microcomputer that sequentially executes the control software to be verified. The microcomputer 101 includes, for instance, a CPU core 103 for interpreting and executing the control software, a peripheral device 104 that is connected to the CPU core 103 via an internal bus 106, and an interrupt controller 105 as essential functional blocks.

For example, a general-purpose timer unit, analog-to-digital converter, or communication module (none of these components are shown in the figure) may be employed as the peripheral device 104. The peripheral device 104 exchanges information with the outside via an input/output signal line 107.

Timing information 108 about a series of events handled by the peripheral device 104, such as a compare match and output compare by a timer, the end of analog-to-digital conversion, and the end of communication frame transmission/reception, is conveyed to the interrupt controller 105.

In addition to the above-mentioned information, an IRQ interrupt signal 109, which is conveyed to the microcomputer 101 from the outside in accordance with a signal level change, a software trap instruction interrupt signal 110, which the CPU core 103 itself generates upon receipt of a control software's instruction, and a warning interrupt signal 120, which is generated by an after-mentioned verification device 102 according to the present invention, are in parallel input to the interrupt controller 105.

After masking an interrupt that is not to be used as an event by the control software, the interrupt controller 105 transmits an interrupt signal 111 to the CPU core 103 in accordance with a priority order that is predetermined by hardware or predefined by the control software. This causes the control software to branch to the associated interrupt process.

It should be noted in this connection that the interrupt signal 111 does not cover the entire interrupt information to be input into the microcomputer 101. The interrupt signal 111 represents the information that is arbitrarily sorted out by the interrupt controller 105 in accordance with the control software.

The verification device 102 includes finite state hardware that incorporates a microprogram and operates in parallel with the microcomputer 101, which sequentially executes the control software to be verified.

The verification device 102 may be included in a package for the microcomputer 101 or mounted on the same circuit board as for the microcomputer 101 and electrically wired to the microcomputer 101 as far as it can operate in parallel with the microcomputer 101.

However, since the verification device 102 operates in parallel with the microcomputer 101, provision should be made so that a fault in the microcomputer 101 or in the verification device 102 does not affect the other. It is therefore preferred that the microcomputer 101 and verification device 102 be independent of each other electrically or functionally.

The verification device 102 performs assertion-based verification and includes a microprogrammed control storage 113 as a major device for timing-sequence assertion means.

The control storage 113 includes firmware for assertion-based verification, and stores the assertion information to be verified (verification target), as the behavior of the microcomputer 101 and the behavior of the entire system, which is determined through the information observed by the microcomputer 101. In other words, the control storage 113 stores an internal state, which is predetermined in accordance with the functionality to be implemented by the microcomputer 101, and input information, which indicates a condition for transition from one internal state to another. More specifically, state transition assertion information (timing assertion information) for assertion-based verification is predefined in the control storage 113.

The internal state and transition condition to be stored in the control storage 113 can be derived from a state transition table, which describes operating state transitions of the control software.

The contents of the control storage 113 may be set up before verification via a connection bus 115 by using the data retained by the microcomputer 101 or set up through a write port 114 irrespective of all functional blocks shown in FIG. 1.

The contents of the control storage 113 (stored information about each step) are sequentially read in accordance with operations of the verification device 102, and separately input into a microinstruction register 116 and a control storage address register 117.

The contents of the control storage address register 117 and the contents of a monitor signal 112 for an interrupt event (timing information 108, IRQ interrupt signal 109, or software trap instruction interrupt signal 110) branched immediately before the interrupt controller 105 are subjected to logical synthesis and feedback in a combinational logic circuit 119 and used as a new read address of the control storage 113. When this operation is repeated, the operation of the verification device 102 progresses.

As described above, the verification device 102 uses the monitor signal 112 for an interrupt event as a trigger to advance the state transition for assertion verification, which is predefined in the control storage 113, and waits until an abnormal state transition event occurs.

Therefore, it can be said that the verification device 102 is a sort of finite state machine (sequencer) based on microprogrammed control that uses the monitor signal 112 for an interrupt event as a transition condition. In addition, the verification device 102 starts to operate in parallel with the microcomputer 101 independently of the operation of the microcomputer 101 itself.

The verification device 102 inputs the monitor signal 112 for an interrupt event from the microcomputer 101, operates in parallel in real time according to an operation of the microcomputer 101, estimates the internal state of the microcomputer 101, and detects whether the internal state has deviated from the pre-stored state transition.

When viewed from a different angle, the verification device 102 is a monitoring device that references the assertion information stored in the built-in control storage 113, estimates the internal state of the control software executed by the microcomputer 101 or the internal state of the entire system that can be observed from the microcomputer 101, and checks for an abnormal state.

When an abnormal state transition is detected, the verification device 102 performs an output process for transmitting a warning signal to the outside by changing the contents of the microinstruction register 116, that is, by changing the contents of the control storage 113, which is the transfer source for the contents of the microinstruction register 116.

Either of two different output processes is performed for warning issuance. One output process transmits a warning signal 121 to the outside. In this case, it is assumed that an external monitoring tool, warning lamp, or debugging log collection tool is to be used. The other output process outputs a warning interrupt signal 120 that is fed back and input into the interrupt controller 105. The use of this scheme enables the control software of the microcomputer 101 to recognize the occurrence of an abnormality through the verification device 102. The microcomputer 101 can also store the input of the warning interrupt signal 120 in an appropriate storage as log information.

Figure 2:
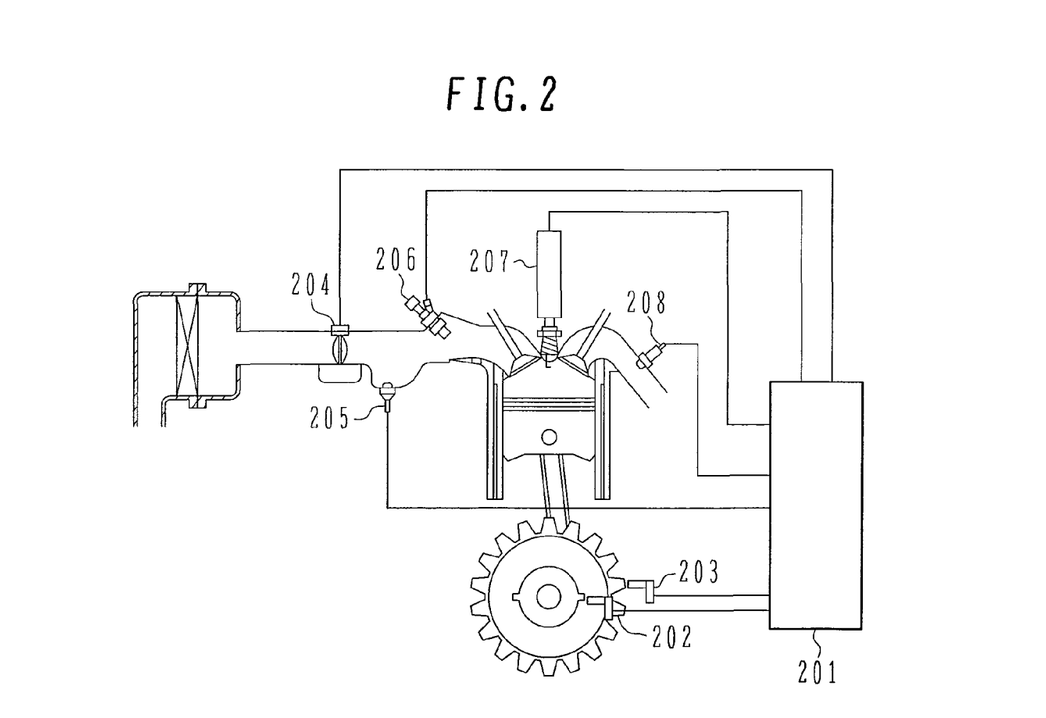
FIG. 2 is an overall view illustrating a system to be verified.

FIG. 2 shows an example of an engine (internal combustion engine) system that is to be verified by the verification device according to the present invention. Although FIG. 2 shows only one cylinder, the example shown in that figure depicts a case where the present invention is applied to an engine control ECU (Engine Control Unit) 201, which governs the fuel supply and ignition for a four-cylinder four-cycle engine. The verification device 102 according to the present invention is mounted in the control ECU 201 together with the microcomputer 101.

Various sensor signals are input into the engine control ECU 201. The sensor signals to be input into the engine control ECU 201 include a crank signal, which a crank angle sensor 202 generates whenever a crankshaft rotates 180 degrees and is used to convey crank angle information to the engine control ECU 201, a sensor signal that is output from a ring gear sensor 203 having a lower angle resolution than the crank angle sensor 202, a sensor signal that is output from an intake pipe pressure sensor 205, which estimates the amount of engine air, and a sensor signal that is output from an $O_2$ sensor 208, which monitors the air-fuel ratio.

Various control signals are output from the engine control ECU 201. The control signals to be output from the engine control ECU 201 include a control signal for a throttle actuator 204, which controls the intake air amount, a control signal for an injector 206, which performs gasoline fuel injection, and a control signal for an igniter 207, which ignites an air-fuel mixture in a cylinder.

Figure 3:
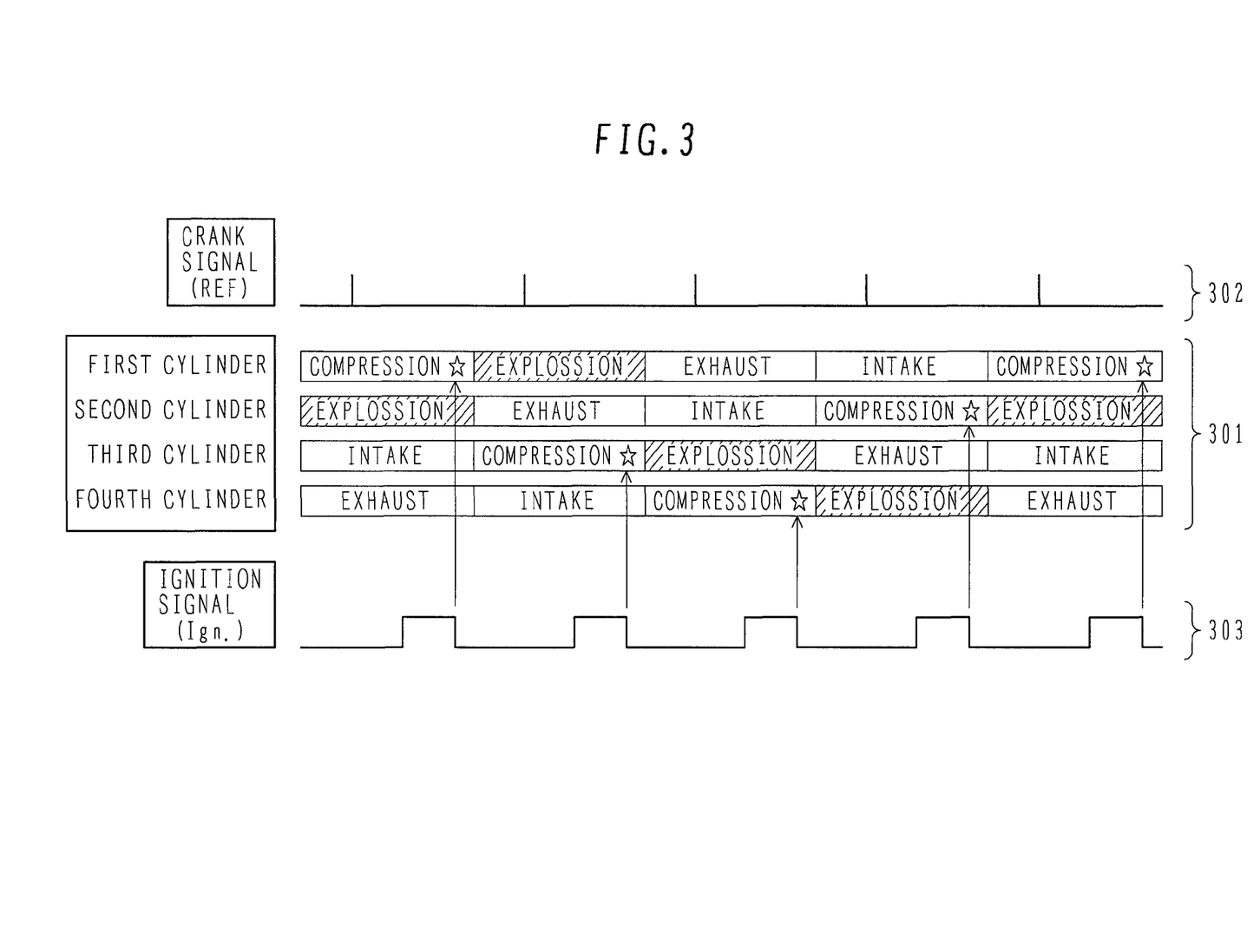
FIG. 3 is a timing diagram illustrating the combustion cycles and ignition timing of a four-cylinder four-cycle engine.

FIG. 3 is a timing diagram illustrating the relationship among a four-cylinder engine crank signal (REF) 302, combustion cycles 301 of individual cylinders constituting a four-cycle engine, and an ignition signal (Ign.) 303.

An embodiment of the verification device 102 for performing assertion-based verification of the soundness of the timing relationship between the crank signal (REF) 302 and ignition signal (Ign.) 303 will now be described.

As is obvious from FIG. 3, the ignition signal (Ign.) 303 is requested to perform an ignition operation between one crank signal (REF) 302 and the next (at intervals of a 180-degree crankshaft angle).

In reality, the ignition signals must be properly distributed to predetermined cylinders. However, the soundness of such an ignition signal distribution function is not to be verified this time. As indicated by the reference numeral 303 in the figure, the soundness of a timer device for generating an ignition reference signal before the ignition signal distribution to cylinders is to be verified.

While the signal level of the ignition signal (Ign.) 303 is High, a coil built in the igniter 207 stores electrical energy for ignition. Actual ignition occurs when the signal level changes from High to Low (this ignition point is marked ☆ within the combustion cycles 301 in FIG. 3).

If the ignition state as defined above is lost in the engine system shown in FIG. 2, it is fatal to merchantability. It causes a driver to recognize that uneven torque is generated by the engine. In addition, emissions performance will be adversely affected.

When, in reality, ignition system control software described above is being created, initially normal control may be degraded due to the loss of some incorporated functions when the specifications are variously corrected. Further, the software may be commercialized with some defects uncorrected. Such a phenomenon may occur due, for instance, to an unprescribed timer device operation under particular control software conditions, cumulative processing delay caused by interrupt signal process races, or runaway software although they are not captured during a normal state.

The above abnormal phenomenon cannot readily be captured because it does not occur frequently; thus, a considerable amount of time is required to debug the control software. Further, no theory has been established for determining the length of the cumulative verification time required for verifying the soundness of a system when no abnormal phenomenon occurs.

Under the above circumstances, the verification device 102 according to the present invention, which provides assertion-based verification, serves as a powerful tool. The verification device 102 can not only prevent the occurrence and recurrence of abnormal phenomena but also operate in parallel with the system and constantly monitor the soundness of the system on line in real time.

Figure 5:
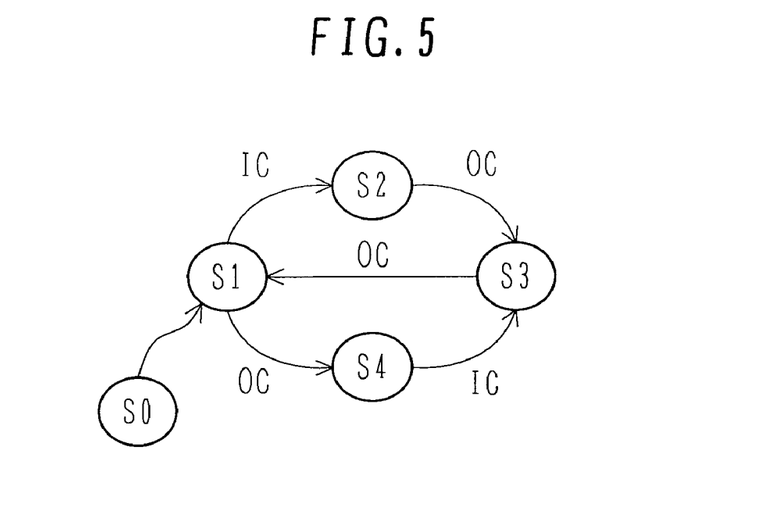
FIG. 5 is a state transition diagram illustrating the relationship between state transitions and the transition conditions (events) of various ignition states.
Figure 6:
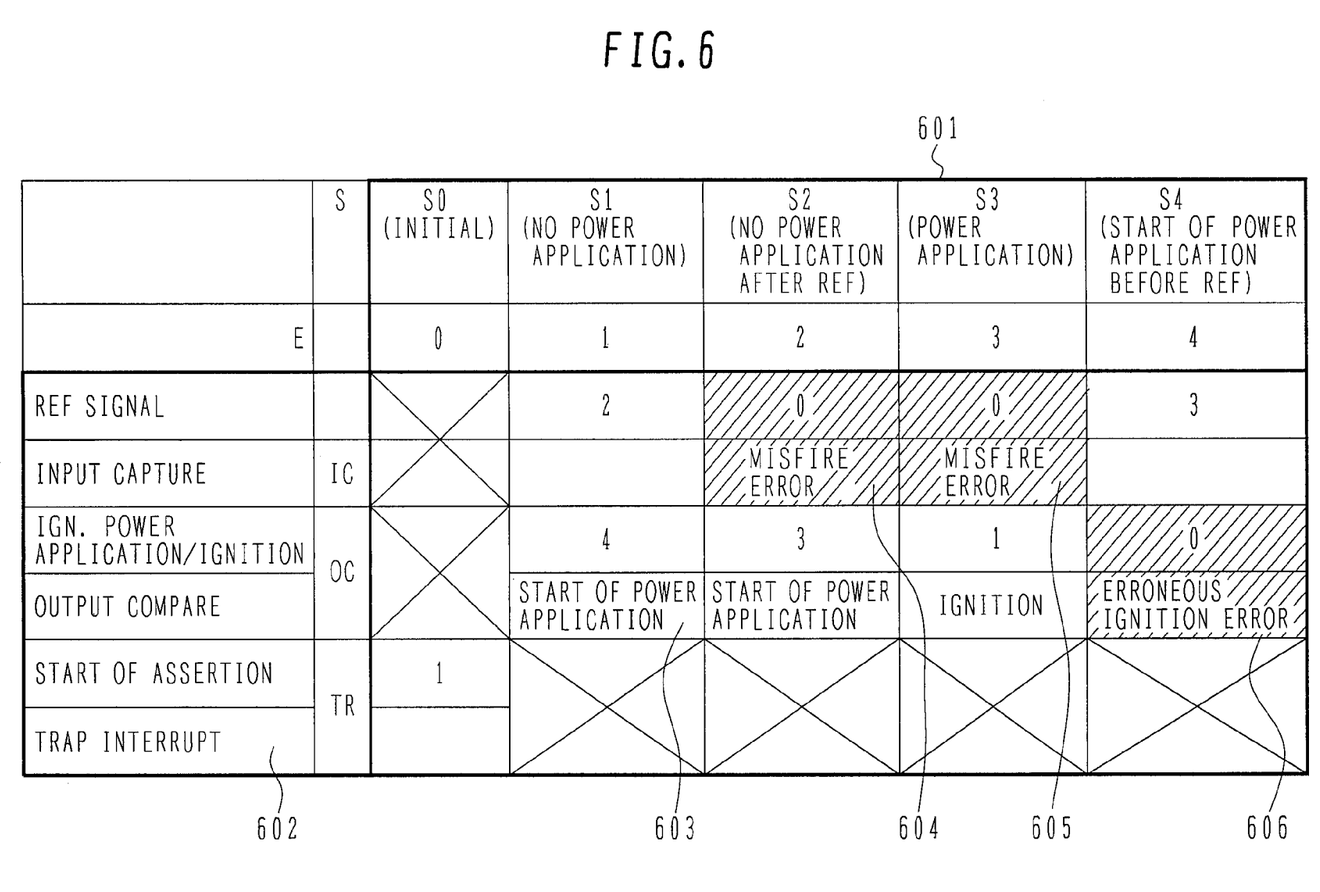
FIG. 6 is a state transition table illustrating the relationship between state transitions and the transition conditions (events) of various ignition states.

An embodiment of the verification device 102 that provides assertion-based verification will now be described with reference to a timing diagram (FIG. 4), a state transition diagram (FIG. 5), and a state transition table (FIG. 6).

Figure 4:
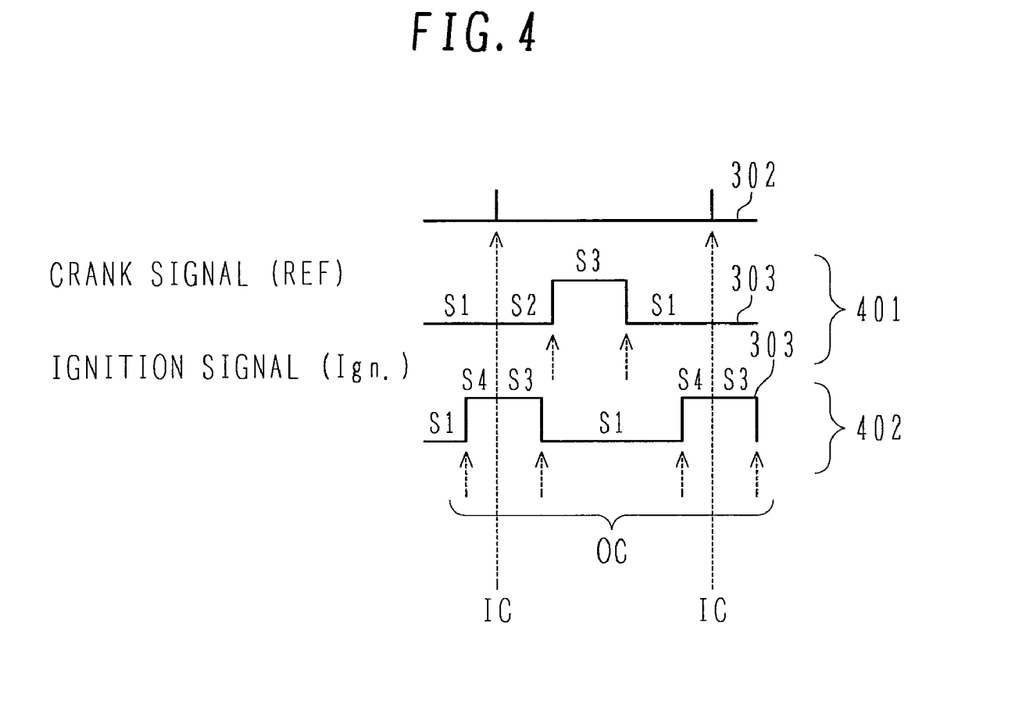
FIG. 4 is a timing diagram illustrating the relationship between the states of a crank signal and ignition signal for a four-cylinder four-cycle engine.

FIG. 4 is a timing diagram illustrating waveforms of the crank signal (REF) 302 and ignition signal (Ign.) 303.

The intervals of the crank signal (REF) 302 vary with engine speed. More specifically, the interval between one crank signal (REF) and the next is long when the engine speed is low and decreases with an increase in the engine speed.

The period during which the ignition signal (Ign.) 303 is High is determined according to the electrical energy to be stored in the igniter 207. It is independent of the engine speed.

Therefore, when the engine speed is low, the High" period of the ignition signal (Ign.) is between two adjacent crank signals (REF) as indicated by the reference numeral 401 in FIG. 4. When, on the other hand, the engine speed is high, the "High" period of the ignition signal (Ign.) ranges crossing the crank signal (REF) as indicated by the reference numeral 402.

In any case, an engine ignition point at which the level of the ignition signal (Ign.) 303 changes from High to Low occurs once and should occur once between the two adjacent crank signals (REF).

A timing signal for changing the level of the ignition signal (Ign.) 303 from High to Low and a timing signal for changing the level of the ignition signal (Ign.) 303 from Low to High is generated when a general-purpose timer, which is a peripheral device 104, exercises its compare match function. The timing signal generated in this manner constitutes a factor for interrupt signal generation. This phenomenon is briefly referred to as an output compare (OC).

Meanwhile, the intervals of the crank signal (REF) 302 are measured by an input capture function of the general-purpose timer for engine-speed measurement purposes. Similarly, this measurement constitutes a factor for interrupt signal generation. This phenomenon is briefly referred to as an input capture (IC).

The states of a finite state machine will now be defined with attention paid to the temporal relationship between the crank signal (REF) 302 and ignition signal (Ign.) 303.

The states to be defined are represented by the symbols S1 to S4 as shown in FIG. 4. State S1 is defined as a state in which the crank signal (REF) 302 has not arrived and the ignition signal (Ign.) 303 is Low. State S2 is defined as a state in which the crank signal (REF) 302 has arrived and the ignition signal (Ign.) 303 is Low. State S4 is defined as a state in which the crank signal (REF) 302 has not arrived and the ignition signal (Ign.) 303 is High. State S3 is defined as a state in which the crank signal (REF) 302 has arrived and the ignition signal (Ign.) 303 is High.

If the formulated definition is such that the crank signal (REF) is considered to have not arrived when state S3 arises, state S1 follows state S3. Ignition occurs at the time when the status changes from state S3 to state S1.

FIG. 5 is a state transition diagram that illustrates various states while regarding the output compare (OC) and input capture (IC) as events constituting transition conditions.

In FIG. 5, the circled symbols represent states that correspond to the states shown in FIG. 4. Each state is connected to another state with arrows. The direction of the arrow indicates that of state transition. Alphabetical characters attached to the arrows (IC and OC) indicate a transition condition that serves as a trigger for state transition. In FIG. 5, state S0 is a state in which the verification device 102 is in its initial state, that is, a standby state before the start of assertion-based verification.

The relationship to the waveforms of the ignition signal (Ign.) when the engine speed is low (401) or high (402) as indicated in FIG. 4 is summarized below:

When the engine speed is low: The state repeatedly changes from S1 through S2, S3 to S1.

When the engine speed is high: The state repeatedly changes from S1 through S4, S3 to S1.

FIG. 6 is a state transition table that indicates the above-mentioned state transitions. In this table, the types of various states (601) are indicated in the row direction with the types of transition events (602) indicated in the column direction. A state transition that occurs when a particular event is input in a particular state can be determined by viewing the cell at the intersection of the column related to the event and the row related to the state.

For example, a state transition that occurs when an OC event is input in state S1 can be determined by viewing cell 603. In cell 603, the upper row reads "4" while the lower row reads "Start of power application". The number "4" in the upper row indicates that the state is about to change to state S4. The lower row generally indicates the process that is to be performed upon state transition. However, the verification device 102 according to the present invention merely estimates an internal state transition of the control software incorporated in the microcomputer 101 (or functional requests for the entire system) and monitors the behavior. Therefore, the meaning of a state transition as the enitre system is indicated here.

A cell marked x indicates an impossible combination of a state and an event. It means that no state transition occurs even if any such event arises. It can be considered that the current state arises again upon state transition.

The S0 column corresponds to state S0, which is shown in FIG. 5. It means that the step does not proceed so as to the S1 column to start an assertion verification process until the microcomputer issues a software trap instruction ("TR" event (602) in FIG. 6).

Cell 604 indicates that an IC event occurred during state S2. It means that the level of the ignition signal (Ign.) did not rise from Low to High during a period of the crank signal (REF). It obviously indicates a "misfire" error. When such an abnormal transition is detected, the verification device 102 generates the aforementioned warning signal so that the status changes to state S0 to stop the verification process.

In FIG. 6, abnormal transitions that entail the generation of a warning signal are indicated by hatched cells.

Similarly, cell 605 indicates that an IC event for the next crank signal (REF) arrived while the ignition signal (Ign.) was High. It implies that a "misfire" error occurred due to delayed ignition timing.

Cell 606 indicates that ignition occurred again during the time interval between the instant at which ignition was already invoked by the crank signal (REF) and the instant at which the next crank signal (REF) arrives. It implies that an "erroneous ignition" error occurred.

As described above, the verification device 102 traces state transitions and detects an abnormal state when it recognizes a deviation from the normal state transitions shown in FIG. 5.

Figure 7:
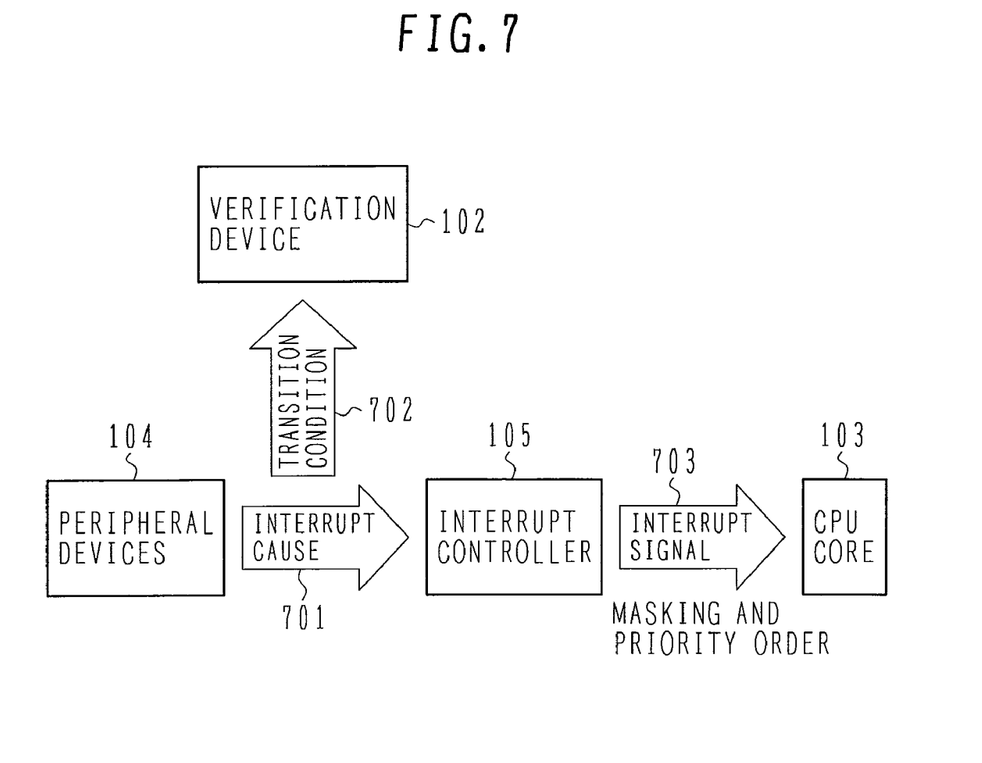
FIG. 7 is a functional block diagram illustrating an interrupt process and a position at which a state transition condition (event) is to be collected.

FIG. 7 shows a place from which a transition condition (event) for the verification device 102 is to be collected.

All important events that occur within a peripheral device 104 are individually conveyed to the interrupt controller 105 in the form of an interrupt factor 701.

However, the interrupt controller 105 is under control of the CPU core 103. The reason is that the control software can perform setup through the CPU core 103 to select the interrupt factor to be used and define the priorities of the accepted interrupts.

In other words, when interrupt factors 701 are passed through the interrupt controller 105, they are turned into interrupt signals 703 that have been subjected to masking and prioritization processes and sequentially conveyed to the CPU core 103.

As mentioned earlier, it is demanded that the verification device 102 acquire the information about all interrupt factors without being disturbed by the control software.

The decision of the priority order is an extra ornamentation for the functions according to the present invention. As is obvious from FIG. 6, the station transitions of the verification device 102 need to be properly performed in accordance with the order of events. The processing time required for such state transitions is negligible when compared to the processing time required for control software execution by the CPU core 103. Thus, there is no need to consider the processing priorities of interrupts.

Under the above circumstances, the essential configuration to be formed is such that a raw interrupt factor 701, which is not yet passed through the interrupt controller 105, is branched and acquired as a transition condition (event) 702 for the verification device 102.

Figure 8:
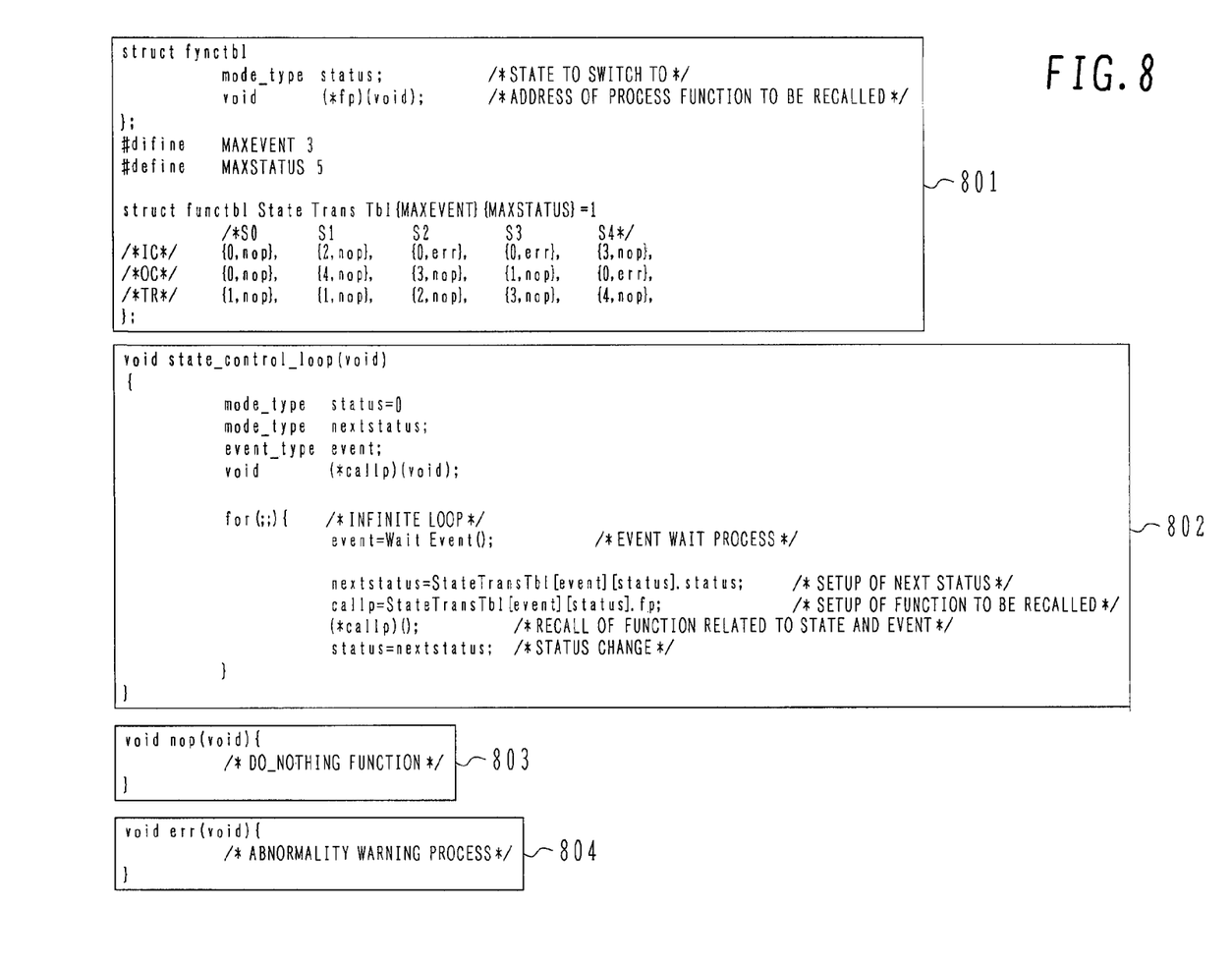
FIG. 8 is a program source list that uses C language to write firmware for the verification device according to an embodiment of the present invention.

FIG. 8 shows executable software that is obtained by converting the state transition table shown in FIG. 6. In FIG. 8, the software is written in C language syntax. In reality, the software is converted to a data string, for instance, by a firmware compiler, and stored in the control storage 113 of the verification device 102.

Program block 801 is obtained when the state transition table shown in FIG. 6 is rewritten as a two-dimensional structure table. A row in the two-dimensional table is searched for by the prevailing status ("status"), whereas a column is searched for by the type of a transition event ("event").

An element in the above two-dimensional table is expressed by the combination of a number and a function name. For example, the array element "{4, nop}" corresponding to cell 603 in FIG. 6 indicates that the next status to proceed to is state S4, which is designated by the array subscript "4", and that the value of a function pointer for the function to be recalled upon transition to the next status is "nop".

Program block 802 shows an execution section that actually performs a state transition trace. The flow of execution will be described later with reference to a flowchart in FIG. 9.

Program block 803 is a function block that is to be recalled upon normal transition. Program block 804 is a function block that is to be recalled upon abnormal transition. The functions of these two blocks will be described in detail later with reference to the flowchart in FIG. 9.

Figure 9:
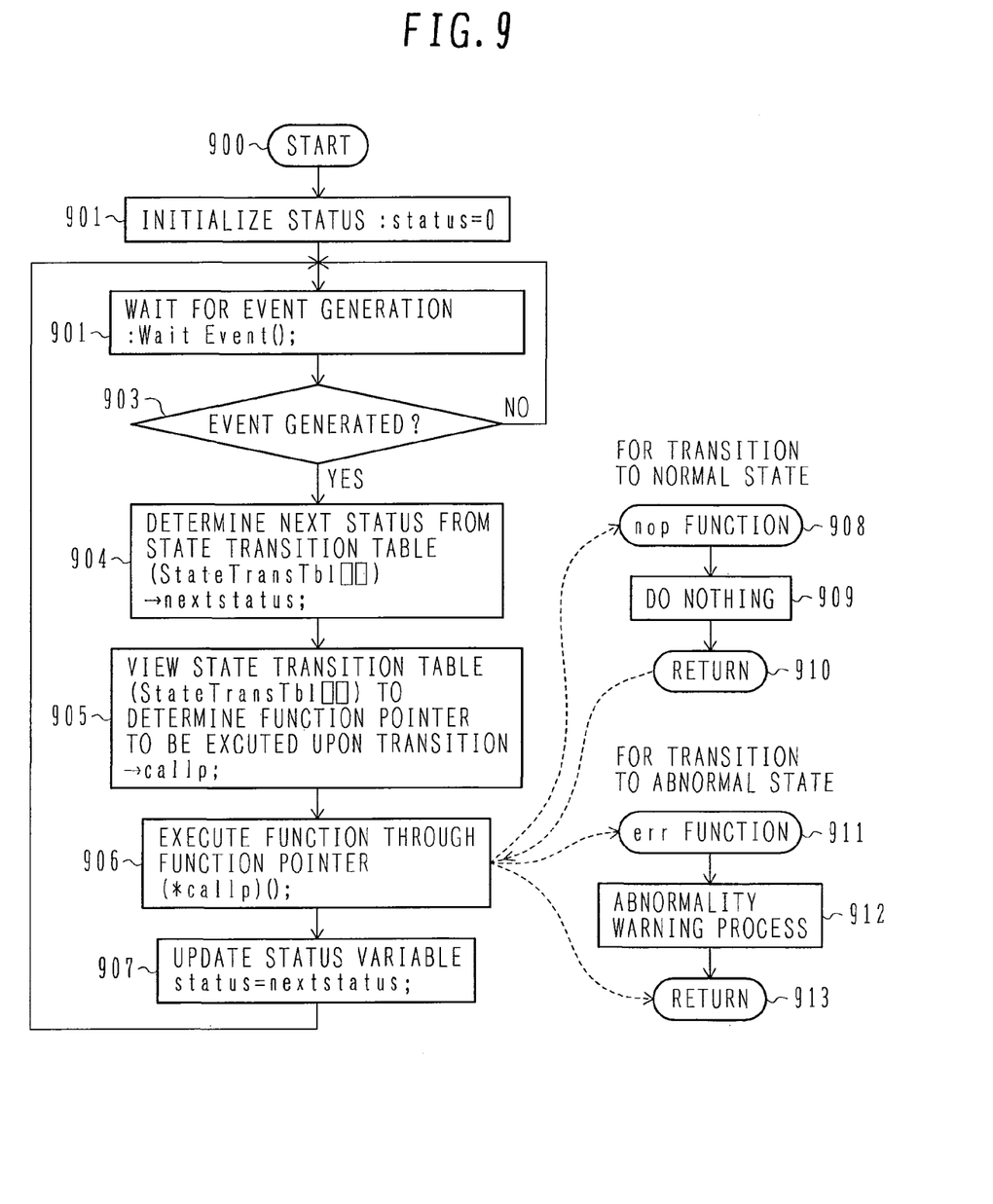
FIG. 9 is a flowchart illustrating operations performed by the verification device according to an embodiment of the present invention.

FIG. 9 is a flowchart illustrating program blocks 802, 803, and 804, which govern main operations indicated in FIG. 8.

A start point 900 is a place where an operation is positioned after the verification device 102 is subjected to a hardware reset. Subsequently, process 901 is performed to initialize the status variable "status". This places the verification device 102 in state S0, which is shown in FIG. 5.

Subsequently, infinite loop processes 902 to 907 are unconditionally performed.

In process 902, an event wait function "WaitEvent( )" is used to wait until an external event is generated. It is assumed that the "WaitEvent( )" function stands by within itself until an event is generated, and returns an event type as a return value when an event is generated. To clarify this attribute, FIG. 9 shows a loop for returning to the beginning of process 902 until judgment 903 indicates that an event is generated.

After an event is generated, the flow proceeds to process 904. In process 904, the current state number and event number are used to search the aforementioned two-dimensional table 801 and acquire the next state number as the variable "nextstatus".

Next, process 905 is performed. In process 905, the current state number and event number are used again to search the two-dimensional table of program block 801 and acquire the value of a function pointer for the function to be executed as the variable "callp".

Next, process 906 is performed. In process 906, the above function pointer is used to call an actual function. Upon normal transition, the "nop function" for processes 908 to 910 is called in accordance with the definition formulated by the two-dimensional table of program block 801, as described earlier, and no process is performed in the present embodiment.

Upon abnormal transition, the "err function" for processes 911 to 913 is called. As mentioned earlier, means for issuing a warning signal to the outside (warning signal 121 shown in FIG. 1) or transmitting a warning interrupt signal to the microcomputer (warning interrupt signal 120 shown in FIG. 1) can be used to exercise the "err function".

Next, process 907 is performed. In process 907, the new state number obtained in process 904 is used to update the status variable "status", which indicates the current status, by rewriting its contents.

Next, control is returned to process 902. Infinite loop processes 902 to 907 are then permanently performed until the power is turned off.

The processing procedures described above are performed by the functions of the firmware stored in the control storage 113 of the verification device 102. However, a synchronization process and an abnormality warning process, which are indicated in flowcharts in FIGS. 10 and 11, are performed by the functions of the control software for the microcomputer 101.

Since the verification device 102 and microcomputer 101 start to operate in parallel with each other independently of each other's operation, a synchronization process must be performed at the beginning of their operation to ensure that their status recognitions match. Further, since the operation stops (the status returns to state S0) when the verification device 102 detects an abnormality, the synchronization process needs to be performed also to subsequently restart the verification device 102.

Figure 10:
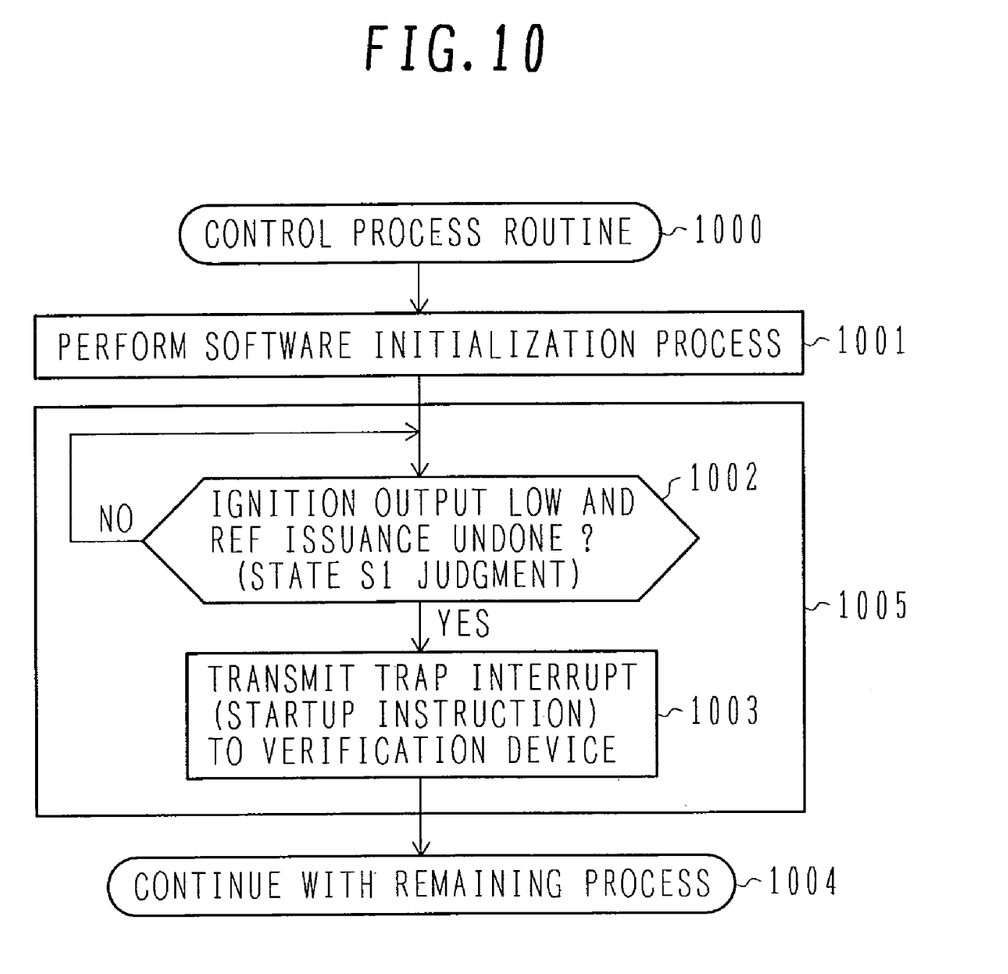
FIG. 10 is a flowchart illustrating a verification device startup routine of control software for the microcomputer.
Figure 11:
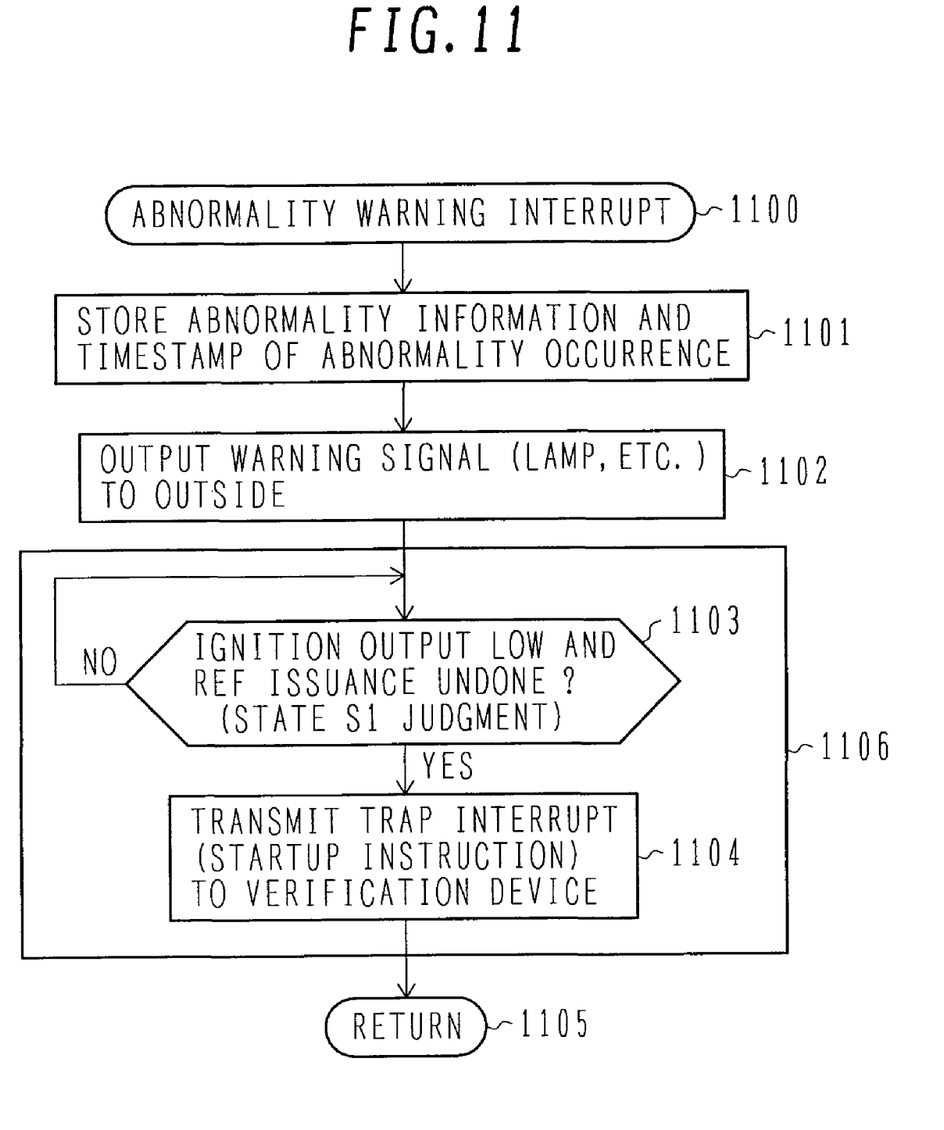
FIG. 11 is a flowchart illustrating an abnormality warning interrupt processing routine of control software for the microcomputer.

A start point 1000 in FIG. 10 is a point at which the control software for the microcomputer 101 begins to start up. It also represents the place after a hardware reset.

Next, process 1001 is performed. In process 1001, an overall engine control initialization process is performed including the ignition control according to the present embodiment. Subsequently, the flow proceeds to judgment 1002.

Judgment 1002 is formulated to determine whether the entire system is in state S1, which is shown in FIGS. 4 and 5. If the entire system is not in state S1, a standby operation is performed.

State S1 is a state in which the engine is stopped. It is therefore obvious that state S1 prevails immediately after startup. However, the above judgment is formulated to achieve synchronization with the verification device 102 even in the cases of a certain processing delay or the immediate startup right after the power is turned on.

After it is confirmed that the system is in state S1, process 1003 is performed to transmit a software trap interrupt to the verification device 102. This operation places the verification device 102 in state S1 so that the microcomputer 101 and verification device 102 synchronize with each other.

FIG. 11 is a flowchart illustrating an abnormality warning interrupt processing routine that the microcomputer 101 executes after the verification device 102 detects an abnormal transition and transmits a warning interrupt to the microcomputer 101 as described earlier.

Processing begins with an interrupt process entry 1100. In process 1101, a nonvolatile storage (not shown) stores snapshots of the engine speed, intake air amount, or other prevailing important variables of the control software as abnormality information together with the current timestamp.

Next, process 1102 is performed. In process 1102, a warning signal (e.g., lamp illumination) is output to the outside so that the driver can recognize the abnormality. The warning signal output is generated by the microcomputer 101 and different from the warning signal 121 shown in FIG. 1, which is output from the verification device 102. It is, for instance, an output (input/output signal 107 shown in FIG. 1) that is generated from a digital output port, which is a peripheral device 104 shown in FIG. 1.

Block 1106, which includes subsequent judgment 1103 and process 1104, is the same as block 1005, which includes blocks 1002 and 1003 shown in FIG. 10. This block 1106 performs a synchronization process that is necessary for restarting the verification device 102, which has reported an abnormality and has stopped.

The meaning and function of the synchronization process are the same as described with reference to FIG. 10.

Preferred embodiments and advantages of the control microcomputer verification device according to the present invention will now be individually described.

(1) The verification device 102, which performs assertion-based verification, is independent hardware that is entirely different from the microcomputer 101, and does not consume the CPU time of the control software itself. Therefore, the control software can use given resources to deliver the optimum performance without regard to the presence of the verification device 102.

Further, the hardware of the microcomputer 101 is independent of the hardware of the verification device 102, but at the same time the microcomputer 101 and verification device 102 operate in parallel with each other. Therefore, even if the stop function of the control software, which is run by the microcomputer 101, is impaired, the verification function of the verification device 102 remains intact.

(2) When the verification device 102 is implemented by a finite state machine based on microprogrammed control, various verification items can be handled by rewriting the contents of a built-in control storage. Since the microprogrammed control technology has long been established, hardware can be produced at low cost. For example, this technology is used not only for the microcomputer but also for a sequencer for a peripheral device such as a general-purpose timer or communication module.

(3) The verification device 102 can readily perform assertion-based verification by using the finite state hardware that incorporates a microprogram and operates in parallel with the microcomputer, which sequentially executes the control software to be verified. Further, the items to be verified can be rewritten since this hardware stores them in the control storage. Therefore, the verification device 102 can cover a wide range of verification items including the verification of functional requests for the entire system and the verification of the quality of vehicle-mounted control software.

(4) The control software for a vehicle-mounted device is often designed in accordance with a state transition table. Further, many designers are experienced in writing the state transition table. Therefore, they may find it easy to write the state transition table. Consequently, the efficiency of creating the verification device 102 is enhanced by deriving the contents of the control storage, which is to be used by a microprogrammed control method, from the state transition table that describes operating state transitions of the microcomputer 101.

Further, an extra control portion may be removed, for simplification purposes, from the control software that is not to be verified, so that only a framework (the skeleton of a control algorithm) is used as the contents of the control storage of the verification device 102. Meanwhile, the contents of assertions may be extracted as functions required by the entire system independently of the control software, compiled, and used as the contents of the control storage of the verification device 102. In other words, two different types of assertions can be verified. More specifically, assertions that are derived from the downstream side of the current control software base and assertions that are derived from the upstream side and based on system function requests can be verified.

The aforementioned embodiment relates to the assertions that are derived from the upstream side and based on the system function requests.

(5) The vehicle-mounted control software often invokes state transitions in accordance with external phenomenal changes (events). Particularly, it is characterized by the fact that an interrupt signal generated from the outside or from a peripheral device is used as a state transition trigger. Therefore, when the interrupt signal is in parallel input into the verification device 102, the state transitions of the control software can be properly estimated from the outside.

However, this interrupt signal can be masked by the interrupt controller 105 within the microcomputer 101. Therefore, if the signal remaining after the interrupt controller is directed to the verification device 102, it means that the input into the verification device 102 can be undesirably limited by the control software. Further, even if an interrupt is not used as a state transition trigger for the control software (that is, even if an interrupt is not subjected to the interrupt processing by masking), it could be an important interrupt signal for a peripheral device or the entire system.

Therefore, an interrupt signal that does not pass through the interrupt controller should preferably be used as an input so that the verification device 102 can independently specify whether an interrupt factor is necessary or not.

The above is essential particularly when an assertion from the upstream side is to be performed in accordance with the aforementioned system function requests. As regards the input into the verification device 102, it is therefore preferred that all interrupt signals entering the interrupt controller be monitored and rendered usable as a state transition trigger for the verification device 102.

(6) The verification device 102 stores normal and abnormal state transition patterns of the microcomputer 101 and control software to be monitored.

It rather means that normal state transition patterns are stored, and that any state transition patterns deviating from the normal state transition patterns can be judged as abnormal. The verification device 102 constantly estimates the internal state transitions within the microcomputer 101 and control software to be monitored. It may be assumed that the internal state of the microcomputer 101 and control software is constantly synchronized with the internal state of the verification device 102, which is based on microprogrammed control.

In this respect, the internal state and state transitions of the verification device 102, which are based on microprogrammed control, are assertions that are obtained by extracting skeletal state transition patterns of the control software (or state transition patterns derived from system requests issued from the upstream side) and by making pairs of events and states.

Therefore, if the behaviors of the microcomputer 101 and control software deviate from such assertions, chronologically estimated values of events differ from the patterns preset in the verification device 102.

The verification device 102 detects such a difference, judges that event timing is abnormal, and outputs a warning signal to the outside. The warning signal may be output to a monitoring tool positioned outside a vehicle-mounted control device, a protection device installed outside for functional safety assurance, or a backup device, or may be as a warning lamp for the vehicle driver.

Further, when an abnormality is detected, an interrupt signal is fed back to the microcomputer core to be monitored, thereby enabling the microcomputer core itself to judge that an abnormality has occurred. In this manner, a function useful for self-diagnosis is added.

(7) Persons who create control software understand that using an interrupt signal as a control software state transition trigger (event) is not adequate for the purpose. For example, an analog-to-digital conversion value change or a DI/DO (digital input/digital output) signal change can be used as a state transition trigger for the control software. The aforementioned software trap interrupt is used to properly convey such changes to the verification device 102 and achieve the internal state synchronism between the control software and verification device.

This software trap interrupt is called upon control software state transition. Since this interrupt is merely used to convey a state transition trigger to the verification device 102, the control software does not perform any process in response to this interrupt.

Consequently, the resource (e.g., CPU time) consumption is minimized, and the internal state of the control program can be synchronized with the internal state of the verification device.

(8) The verification device 102 and microcomputer 101 can be incorporated together into a vehicle-mounted control device for commercialization purposes. Recently, the functions of vehicle-mounted control devices are enhanced. As mentioned earlier, some vehicle-mounted control devices, such as electronic power steering (EPS) device and an electromechanical braking device (Brake by Wire), are about to supersede conventional mechanical parts.

When the above safety-related functional parts are to be computerized, various protection circuits, diagnostic circuits, and backup circuits are required to assure functional safety. The verification device 102 according to the present invention can be used as an onboard abnormality monitoring device for embedding in a product to meet the above applications requirements.

What is claimed is:

1. A control microcomputer verification device that is installed separately from a microcomputer that sequentially executes control software, is allowed to operate in parallel with the microcomputer, and verifies a function that is to be implemented by the microcomputer when the control software is sequentially executed, the control microcomputer verification device comprising:

> timing-sequence assertion means for storing an internal state that is predefined in accordance with the function to be implemented by the microcomputer and input information indicating a condition for transition from one internal state of the microcomputer to another,
>
> wherein the timing-sequence assertion means operates in parallel in real time according to an operation of the microcomputer, estimates the internal state of the microcomputer, and detects whether the internal state has deviated from the transition condition.

2. The control microcomputer verification device according to claim 1, wherein, when a deviation from the transition condition is detected, an output process is performed to issue a warning.

3. The control microcomputer verification device according to claim 2, wherein the output process for the warning issuance is performed to output a warning signal to the outside by using a hardware output of the timing-sequence assertion means or output an interrupt signal to the microcomputer to have the microcomputer recognize the abnormality detection.

4. The control microcomputer verification device according to claim 1, wherein the timing-sequence assertion means is provided separately from the microcomputer as hardware formed by a finite state machine based on microprogrammed control.

5. The control microcomputer verification device according to claim 1, wherein the timing-sequence assertion means includes a control storage based on microprogrammed control, derives the internal state and the transition condition from a state transition table describing the operating state transition of the control software, and performs assertion verification of state transition.

6. The control microcomputer verification device according to claim 1, wherein the timing-sequence assertion means in parallel inputs an interrupt event signal, which is input to an interrupt controller from the outside of the microcomputer or from peripheral devices as an input of hardware formed by a finite state machine, and performs assertion verification of state transition.

7. The control microcomputer verification device according to claim 1, wherein the timing-sequence assertion means inputs an interrupt signal based on a software trap instruction, which is fed back from the microcomputer to an interrupt controller, as an input of hardware formed by a finite state machine, and performs a process for synchronizing with software sequentially executed by the microcomputer.

8. A vehicle-mounted control device that includes the control microcomputer verification device according to claim 1.

* * * * *